Patented Oct. 28, 1947

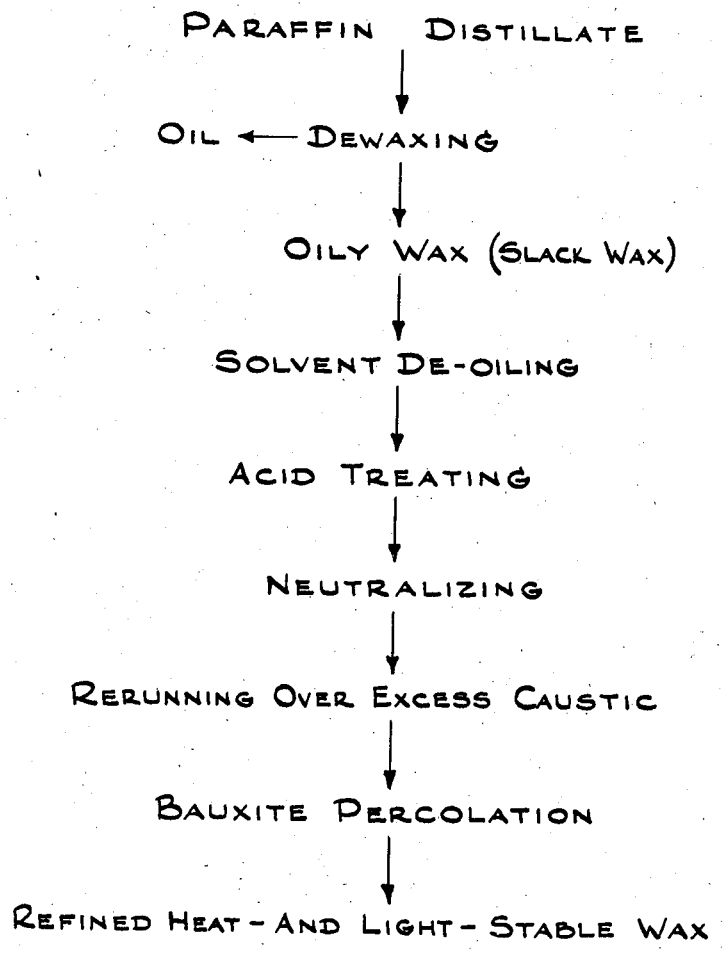

2,429,727

UNITED STATES PATENT OFFICE 2,429,727

REFINING WAXES

Robert A. Macke, Westfield, and Herman J. Zoeller, Union, N. J., assignors to Standard Oil Development Company, a corporation of Delaware Application April 6, 1946, Serial No. 660,040

11 Claims. (Cl. 196—21)

The present invention is concerned with the refining of paraffin waxes which are segregated from petroleum or other mineral oil sources. The invention more particularly relates to an improved process comprising a particular arrangement and sequence of stages by which waxes having a high heat and light stability are secured.

It is well known in the art to separate waxy constituents from petroleum oils by various processes and to refine the crude waxes separated by subjecting them to carefully regulated heat treatment, usually in a sweater house. Separation of the waxy constituents from feed oils by conventional methods usually comprises chilling the waxy feed oil to temperatures at which the wax crystallizes and passes out of solution, followed by filtering the chilled mixture. The waxes so obtained usually retain appreciable amounts of the oily constituents, the concentration of which may vary from about 5% to about 50%, or more, based upon the oily wax. These waxes, termed slack waxes, due to the amount of oil present, are semi-solid and unctuous in nature, particularly so when the amount of oil present is relatively high. The slack wax cake is removed from the filter press, melted in a suitable receptacle and conveyed in a molten state to sweating apparatus, the conventional form of which comprises a multiplicity of shallow metal pans stacked one above the other. Each pan is equipped with a false perforated bottom and a continuous coil of pipe through which a heating or cooling fluid may be circulated. The stack of pans is closed within the building, commonly known as a sweater house. The usual practice in charging the sweater pans is to fill each pan with water to the height of the false bottom which is withdrawn from the bottom of the pan after the wax charge has solidified. The molten wax is then charged to the pan in such a way that it floats upon the water and that the interface between the wax and oil is slightly above the perforated plate. Under these conditions the pipe coil which is disposed immediately above the false bottom is submerged in the wax.

The molten wax is solidified by circulating cooling water, or an equivalent cooling medium through the coil and by means of cool air which is passed through the sweater house. After the crude wax is solidified, it is sweated and the oily constituents removed by gradually increasing the temperature of the oil-wax cake by circulating a heated fluid in the submerged coil and heated air within the sweater house. As the temperature of the crude wax cake rises, the oily constituents are first removed. After removal of an appreciable amount of the oily constituents, waxes of gradually increasing melting points are removed. These waxes contain gradually diminishing percentages of oil as the sweater house temperature and the melting points of the fused waxes increase. Finally, the sweating operation progresses to the point where only the porous structure of the highest melting point wax remains in the solid stage on the perforated false bottom since the other wax fractions have melted out and have been drained off by grades to storage receptacles. The remaining solid, relatively high melting point wax is substantially oil-free and is known in the art as crude scale wax. Crude scale wax contains approximately 2% of oil based upon the wax and is hard and firm, and generally possesses some discoloration. This crude scale wax is subjected to further sweating in order to remove the remainder of the oil, and to produce a refined high grade wax.

The oil can also be largely removed from oily wax, either crude scale wax or slack wax, by the so-called solvent de-oiling process, in which refined waxes are produced by solvent recrystallization from solvents such as ketones, benzol-ketone mixtures, chlorinated solvents, hydrocarbons, etc.

However, the refined waxes secured by a subsequent sweating of the crude scale wax or by solvent de-oiling are not entirely satisfactory with respect to their stability when subjected to heat and light. The instability of these waxes is a particular disadvantage since it renders them unfit for many uses, such as the coating of paper for use in conjunction with the handling of food materials. The instability of petroleum waxes with respect to heat and light is aggravated when the waxes are secured from particular crudes such as a Panhandle crude, a Salt Flat crude, or a Reagan type crude.

In order to overcome these inherent disadvantages and to improve the quality of the final wax produced, various proposals have been made. For example, in the conventional procedure slack wax is acid treated, neutralized, and water washed, followed by sweating to crude scale, which in turn is sweated to refined wax. An alternate processing scheme involves acid treating the crude scale, caustic neutralizing, and water washing, followed by sweating to refined wax. However, these operations do not produce a final wax product which has a satisfactory heat and light stability when the wax is derived from said specific crude sources. Similar procedures using solvent de-oiling instead of sweating likewise do not give satisfactory results.

We have, however, now discovered that providing a particular sequence and arrangement of stages be employed it is possible to produce a final wax product of especially high quality which is particularly stable with respect to light and heat. Our wax is, therefore, very desirable for purposes for which waxes produced by the conventional procedure would not be at all satisfactory. For example, the waxes produced by our process are particularly desirable for utilization in conjunction with the preservation of food stocks, medicinals, and the like. In accordance with our process a petroleum wax in the processing of the same is distilled over caustic. Although the slack wax may be distilled over caustic providing a critical amount of caustic be employed, a preferred modification of our process, as disclosed and claimed in application Ser. No. 403,818, filed July 24, 1941, which has now become Patent No. 2,397,969, dated April 9, 1946, of which the present application is a continuation-in-part, comprises acid treating crude scale wax, removing the acid, rerunning the acid treated product over excess caustic, followed by sweating the overhead product under conventional conditions to produce a refined wax product of especially high quality.

Another preferred modification, which is the subject of the present application, comprises the combination process of solvent de-oiling an oily wax and rerunning it over excess caustic. The preferred complete process as illustratively outlined in the flow sheet on the accompanying drawing, comprises dewaxing a waxy distillate such as a waxy lube oil fraction or a paraffin distillate which is the total mixed gas oil and wax-containing lube fraction separated by distillation from a crude petroleum oil, then subjecting the resulting oily wax, generally referred to as slack wax, to a solvent de-oiling step, which will be explained more in detail later, this solvent de-oiling being preferably carried out in one or more stages until the oil content of the wax is reduced at least down to 5 or 10%, and preferably down to 2% or less, as for example 0.5%, then acid treating the resultant de-oiled wax, to remove aromatic and unsaturated hydrocarbons and other constituents, if any, which are reactive with strong sulfuric acid, and which were not previously removed by the solvent de-oiling step, then after removing acid sludge, neutralizing the acid-treated wax with caustic or other suitable neutralizing agent, then rerunning, i. e. distilling, the wax over excess caustic and removing and condensing the distilled wax vapors, and finally subjecting the resultant condensed liquid wax to bauxite percolation to obtain a finished refined paraffin wax of desired heat stability and light stability.

The solvent de-oiling step which constitutes one of the primary features of this invention, may be carried out in a single stage, but preferably is carried out in several stages, or else by continuous countercurrent extraction. The method of operating in several stages preferably comprises heating the oily wax, i. e. slack wax, which may contain 5 to 50%, e. g. about 10%, of oil, with 5 to 15 volumes, preferably about 10 volumes, of a suitable solvent such as secondary butyl acetate per volume of wax, up to a solution temperature such as in the general range of about 125–175° F., preferably about 150° F., followed by cooling to a suitable wax-crystallization temperature in the general range of about 10 to 30° F., for instance about 20° F., and filtering out a partially de-oiled wax containing now only about 5 to 20%, generally about 10%, of the amount of oil originally present in the slack wax used, thus, for instance having about 1% of oil in this partially de-oiled wax, and then repuddling the latter with an additional amount of about 5 to 15 or more, e. g. about 10, volumes of the same or similar type of solvent, per volume of wax, preferably at about 10 to 30° F., e. g. about 20° F., or other suitable temperature below the wax-solution temperature, and finally filter pressing the de-oiled wax to remove the solvent and the oil dissolved therein, thus producing a de-oiled wax containing generally substantially less than 1%, e. g. about 0.5% of oil.

The solvent to be used in the above described solvent de-oiling process, may not only be secondary butyl acetate but other esters having about 4 to 10, preferably about 5 to 8 carbon atoms, such as isopropyl acetate, amyl acetate, isopropyl propionate, isopropyl butyrate, hexyl acetate, etc., as well as other types of organic solvents such as acetone, methyl ethyl ketone, benzol-ketone mixtures, chlorinated solvents, or hydrocarbon liquids or normally gaseous liquefiable hydrocarbon gases such as propane, or other liquids or mixtures thereof having preferential solvency for oil as compared to paraffin wax.

The process of the present invention may be widely varied. It is to be understood that the respective steps may comprise any suitable number and arrangement of stages. The invention essentially comprises solvent de-oiling the wax and distilling it over caustic, preferably, an alkali metal hydroxide, e. g. sodium or potassium hydroxide, solution, or suspension. Alkali metal carbonates as, for example, sodium carbonate may also be employed.

Although the operation may be adapted for the treatment of waxes segregated from any mineral oil, it is particularly suitable for the treatment of waxes separated from petroleum oils, especially of the Panhandle type, which waxes are quite unstable with respect to heat and light. Although the Panhandle and other certain crudes have been mentioned above as being particularly suited for the purposes of this invention, the process is considered broadly applicable for refining a distillable petroleum wax which normally has poor heat- and light-stability even after acid treatment, de-oiling, and bauxite filtering.

The slack waxes segregated from petroleum oils by conventional operations usually contain from about 5% to 50% of oil. These waxes when sweated yield from about 25% to 75% crude scale wax, based upon the slack wax. The crude scale waxes when sweated result in a yield of about 20% to 65% of refined waxes based upon the slack wax.

Although it has been suggested above that the solvent de-oiling step be used as the essential method of removing oil from the oily slack wax, and that this solvent de-oiling step should precede the acid treatment and rerunning over excess caustic, this order of procedure is not absolutely essential, and other modified procedures may be used. For instance, if the slack wax to be used contains a relatively small amount of oil such as 5 to 10% or less, it may suitably be refined by acid treating, neutralizing, rerunning over excess caustic, and then solvent de-oiling, preferably followed by bauxite percolation. Also one may use a combination of sweating and solvent de-oiling, such as by first subjecting the oily slack wax to a solvent de-oiling to reduce the oil content of the wax down to 1% or so, then acid treating, neutralizing, rerunning over excess caustic and then sweating to reduce the oil content down to the range of 0.1 to 0.2% or so, and finally bauxite percolating. If preferred, the sweating may be applied immediately after the solvent de-oiling, so that for instance a slack wax containing about 10% of oil would be solvent de-oiled down to a 1% oil content, then sweated down to an 0.1 or 0.2% oil content and then subjected to the acid treating, neutralizing, rerunning over excess caustic, and bauxite percolation. On the other hand, if preferred, the slack wax may first be sweated to a crude scale wax containing about 1 to 3% of oil, then acid treated, neutralized, rerun over excess caustic, and then solvent de-oiled, and finally subjected to bauxite percolation. A still further modification comprises subjecting the slack wax to an initial sweating to a crude scale wax and then immediately solvent de-oiling, and then following with the other steps previously described, namely acid treating, neutralizing, rerunning over excess caustic and final bauxite percolation.

Although solvent de-oiling and sweating both accomplish a similar primary objective, namely reduction of the oil content of an oily wax, there is reason to believe that they function in a slightly different way, and that the small amount of residual oily constituents left after subjecting a wax to one of these steps, is not exactly the same as after subjecting it to the other. In any event, the solvent de-oiling, with or without sweating, and together with acid treating, still leaves some constituents in the wax which tend to impair its heat and light stability, so that rerunning over excess caustic must be used to remove this other type of impurities.

The acid employed in the acid treating stage may comprise any suitable mineral acid but it is preferred to employ a sulfuric acid having a concentration in the range from about 83% to about 104%. The amount of acid employed may be in the range from about 3 pounds to about 50 pounds, preferably about 5 to 40 pounds, of acid per hundred gallons of wax. In general, it is preferred to contact the wax and the acid at a temperature in the range from about 150° F. to about 200° F.

The alkali solution employed in the distillation stage and in the neutralization stage may comprise any suitable alkali. In the distillation stage, an excess amount of the alkali is employed whereas in the neutralization stage an amount is used which is necessary to neutralize the acidic constituents. Although potassium hydroxide or sodium carbonate solutions may be employed, we prefer to use sodium hydroxide solutions such as those having a concentration in the range from about 34° to about 38° Baumé. When utilizing excess sodium hydroxide it is preferred to use from 0.01 to 0.5% excess. For example, when directly distilling the slack wax over caustic the amount of excess caustic employed should be in the range from about 0.2 to 0.3%. Also about 0.01 to 0.1% excess caustic should be employed with the acid treated crude scale wax or solvent de-oiled wax. The distillation operations over the caustic are conducted under either atmospheric or vacuum conditions and at a coil outlet temperature in the range from about 600° F. to about 800° F.

In order to illustrate the invention further, the following examples are given.

Example 1

A paraffin distillate, i. e. a wax-containing lubricating oil fraction, obtained from a Panhandle crude petroleum oil, and containing about 20% of wax, was solvent dewaxed by heating with two volumes of secondary butyl acetate per volume of paraffin distillate, to a temperature of about 150° F. to insure complete solubility, and then cooling to about 20° F. to precipitate paraffin wax which was then filtered out in the form of a slack wax containing about 10% of oil. This was then solvent de-oiled by heating with 10 volumes of the same solvent, i. e. secondary butyl acetate, per volume of slack wax, to about 150° F. to insure complete solution of the wax in the solvent, and then the solution was cooled to a crystallization temperature of about 20° F. and filter pressed. The resultant partially de-oiled wax cake, containing about 1% of oil, was then repuddled with an additional amount of the same solvent, using 10 volumes of solvent per volume of wax, at the same temperature of 20° F. and the mixture was then filter pressed without the use of any wash solvent, resulting in a final de-oiled wax containing about 0.5% of oil.

This de-oiled wax was then treated with 30 pounds of 98% sulfuric acid per 100 gallons of wax at a temperature of about 165–170° F., the sludge settled and removed and the acid-treated wax was neutralized with dilute aqueous caustic soda of about 5 degree Baumé concentration, and divided into two batches, one of which was directly bauxite filtered to a yield of 25 tons of refined wax per ton of bauxite, and the other batch was rerun over 0.2 weight per cent excess caustic soda, in the form of a substantially saturated aqueous caustic solution to give an overhead distillate fraction of 5 to 90% which was then bauxite filtered to the same yield of 25 tons per ton.

These two refined waxes, the one without and the other with rerunning over excess caustic, were then subjected to inspection and stability test with the following results:

|  | Without rerunning | With rerunning |
|---|---|---|
| Melting Point, °F | 129.5 | 129.5. |
| Per cent Oil—ASTM D721-44 | 0.5 | 0.4. |
| Color—Saybolt | +30 | +30. |
| Heat Stability:[1] |  |  |
| Color | 2 T. R. | 3 S. |
| Copper Strip | Black | Slightly Tarnished. |
| Light Stability:[2] Color | 17½ T. R. | 0 S. |

[1] 16 hours at 302° F. in the presence of copper strip (0 S color or higher satisfactory).
[2] 7 days in Sterilamp at room temperature (0 S. color or higher satisfactory).

It is noted from the above table that the refined wax which had been subjected to de-oiling, acid treating, neutralizing, and bauxite filtering, still had an unsatisfactory heat stability since it showed a T. R. (Tag Robinson) color of 2, corresponding to an absolute color greatly in excess of 700, after the heat stability test and also unsatisfactory light stability because it developed a T. R. color of 17½ which corresponds to an absolute color of about 30 or 31 after the light stability test; whereas the refined wax which had been given a similar treatment except with the additional rerunning over excess caustic, showed a satisfactory heat stability and light stability as it had a Saybolt color of 3, corresponding to an absolute color of about 4.6, after the heat stability test, and also satisfactory light stability as it had Saybolt color of 0, corresponding to an absolute color of only 5.3, after the light stability test. In both of these heat and light stability tests, a Saybolt color of 0 or higher is considered satisfactory, or in other words, an absolute color of 5.3 or lower.

For convenience in comparing the Saybolt and Tag Robinson colors with the absolute color scale, all three of these scales are tabulated herewith in position to show their correlation with each other:

| Absolute Color Scale | Saybolt Color | Tag Robinson |
|---|---|---|
| .3 | 30 | ------ |
| .6 | 25 | ------ |
| 1.1 | 20 | ------ |
| 2.3 | 15 | ------ |
| 3.3 | 10 | ------ |
| 4.2 | 5 | ------ |
| 5.3 | 0 | ------ |
| 6.9 | −5 | ------ |
| 8.3 | −10 | ------ |
| 8.8 | ------ | 22 |
| 13.2 | ------ | 20 |
| 27.0 | ------ | 18 |
| 41.0 | ------ | 16 |
| 54.0 | ------ | 14 |
| 81.0 | ------ | 12 |
| 162.0 | ------ | 10 |
| 350.0 | ------ | 8 |
| 465.0 | ------ | 6 |
| 700.0 | ------ | 4 |

*Example 2*

In applying the invention to the use of propane in the solvent de-oiling step, it is preferable to use as the waxy oil starting material a wax-containing lubricating oil. This is preferably de-waxed by a solvent dewaxing using the same solvent, i. e. propane, for instance using a dilution of 3 volumes of liquefied propane to 1 volume of waxy oil, heated to a solution temperature of about 120° F. under a pressure of about 250 lbs./sq. in., then cooled to a temperature within the range of 0° F. to −50° F., and filtered. The resulting wax cake which may contain about 10% of oil, is then heated to about 130° F. and dissolved in 5 volumes of liquefied propane per volume of wax, at that temperature, under a pressure of about 280 lbs./sq. in. The solution is then cooled to about 0° F. to precipitate the wax, and filtered, the wax being washed with about 2 volumes of propane at the same temperature. The resulting partially de-oiled wax, now containing about 1% of oil, may then be repuddled at 0° F. in approximately 5 volumes of liquefied propane solvent. This mixture is then filtered, and washed with about 2 volumes of propane, thereby producing a de-oiled wax containing less than about 0.5% oil. This de-oiled wax is then treated with acid, neutralized, and rerun over excess caustic as in Example 1.

*Example 3*

A benzol-ketone solvent, for instance one consisting of a mixture of about 60% by volume of methyl ethyl ketone with 40% by volume of benzol, may be used with substantially identical procedure as in Example 2 except that atmospheric pressure can be used, and that the wax precipitation and filtration can be carried out at about 20° F. instead of 0° F. or lower. Vacuum filtration may be used if desired. The de-oiled wax is then further refined by the acid treating, neutralizing and rerunning over excess caustic in the same way as in Example 1.

It is not intended that this invention be limited to the specific materials which have been mentioned merely for the sake of illustration but only by the appended claims in which it is intended to claim all novelty inherent in the invention as well as all modifications coming within the scope and spirit of the invention.

What we claim is:

1. Process for refining a distillatable petroleum wax which normally has poor heat and light stability event after acid treatment, de-oiling and bauxite filtering, which comprises subjecting said wax to a combination of two operations, one of which comprises solvent de-oiling, and the other of which consists in distilling said wax over an alkali, using a sufficient excess of alkali to impart the desired heat stability and light stability to said wax, and removing and condensing the distilled wax vapors.

2. Process for the production of highly refined waxes which comprises segregating oily wax from oils containing the same, de-oiling said wax by an operation comprising at least a solvent de-oiling step, to produce an at least partially de-oiled wax containing not more oil than normally present in a crude scale wax, then acid treating said de-oiled wax, neutralizing it, and distilling it over excess alkali, and recovering the overhead.

3. Process according to claim 2 in which the wax is distilled over about 0.1% excess sodium hydroxide.

4. Process according to claim 2 followed by bauxite percolation.

5. Process according to claim 2 followed by sweating to a final oil content not more than 0.2%.

6. Process for the production of highly refined paraffin wax from slack wax which comprises in sequence, solvent de-oiling, acid treating, neutralizing, distilling over excess alkali, and bauxite percolation.

7. Process according to claim 6 using as solvent an ester having about 4 to 10 carbon atoms.

8. Process according to claim 6 using propane as solvent for the solvent de-oiling step.

9. Process for the production of a highly refined wax having satisfactory heat and light stability from a petroleum wax which normally has poor heat and light stability even after acid treatment, de-oiling, and bauxite filtering, which comprises solvent de-oiling said slack wax with about 2 to 10 volumes of secondary butyl acetate per volume of wax, by heating the wax and solvent to a solution temperature of about 150° F., cooling to a crystallization temperature of about 20° F. and filter pressing to obtain a partially de-oiled wax cake, repuddling the latter with an additional amount of the same solvent, using about 2 to 10 volumes of solvent per volume of wax, at a temperature below the solution temperature, and filtering to obtain a finally de-oiled wax, subjecting the latter to acid treating using about 5 to 40 pounds of sulfuric acid having a concentration of about 85 to 105%, per hundred gallons of wax at a temperature of about 130–200° F., removing the resultant acid sludge and neutralizing the acid treated wax with aqueous caustic soda, and distilling the acid treated and neutralized wax over about 0.05 to 0.2% excess sodium hydroxide, to an overhead distillate fraction of about 5 to 90%, removing and condensing the distilled wax vapors, and subjecting the condensed wax to bauxite percolation.

10. The process of preparing purified petroleum wax from waxy distillate obtained from a crude petroleum oil, which comprises subjecting said paraffin distillate to dewaxing to produce a major proportion of oil and a minor proportion of an oily slack wax, subjecting the latter to solvent de-oiling, acid treating, neutralizing, distilling over excess alkali, and bauxite percolation, to produce a refined wax having satisfactory heat and light stability.

11. Process according to claim 2 in which the de-oiling operation also comprises a sweating step.

ROBERT A. MACKE.
HERMAN J. ZOELLER.

REFERENCES CITED

The following references are of record in the file of this patent:

UNITED STATES PATENTS

| Number | Name | Date |
| --- | --- | --- |
| 1,964,953 | Lazar | July 3, 1934 |
| 2,003,789 | Falls | June 4, 1935 |
| 2,121,518 | Breth | June 21, 1938 |
| 2,127,668 | Adams et al. I | Aug. 23, 1938 |
| 2,266,359 | Edwards et al. | Dec. 16, 1941 |
| 2,273,726 | Renshaw | Feb. 17, 1942 |
| 2,315,077 | Pfenning et al. | Mar. 30, 1943 |
| 2,361,582 | Adams et al. II | Oct. 31, 1944 |

Certificate of Correction

Patent No. 2,429,727.  October 28, 1947.

ROBERT A. MACKE ET AL.

It is hereby certified that error appears in the printed specification of the above numbered patent requiring correction as follows: Column 8, line 14, claim 1, for the word "event" read *even*; and that the said Letters Patent should be read with this correction therein that the same may conform to the record of the case in the Patent Office.

Signed and sealed this 6th day of April, A. D. 1948.

[SEAL]

THOMAS F. MURPHY,
*Assistant Commissioner of Patents.*